W. H. Pulver,

Commode.

No. 108,728.    Patented Oct. 25, 1870.

Witnesses:

Inventor.
William H. Pulver
pr Alexander Mason
Atty.

United States Patent Office.

WILLIAM H. PULVER, OF SCHUYLERSVILLE, NEW YORK.

Letters Patent No. 108,728, dated October 25, 1870.

IMPROVEMENT IN PORTABLE PRIVIES.

The Schedule referred to in these Letters Patent and making part of the same.

To all whom it may concern:

Be it known that I, WILLIAM H. PULVER, of Schuylersville, in the county of Saratoga and in the State of New York, have invented certain new and useful Improvements in Portable Privy; and do hereby declare that the following is a full, clear, and exact description thereof, reference being had to the accompanying drawing and to the letters of reference marked thereon, making a part of this specification.

The nature of my invention consists in the construction and arrangement of a "portable privy," calculated for invalids, or to be used in the house for convenience sake, so constructed that the same can be used in the chamber or room, and no offensive odor can escape therefrom.

In order to enable others skilled in the art to which my invention appertains to make and use the same, I will now proceed to describe its construction and operation, referring to the annexed drawing, in which—

Figure 1:
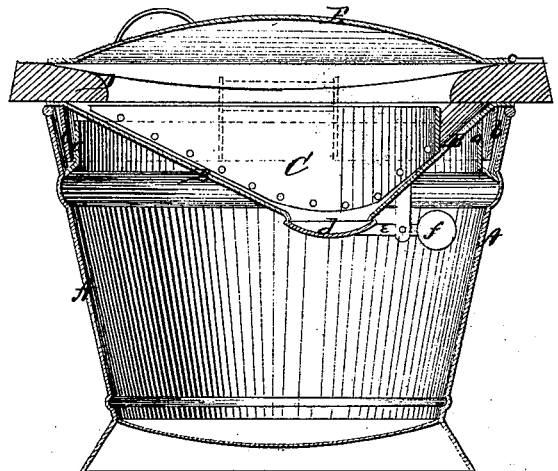
Figure 2:
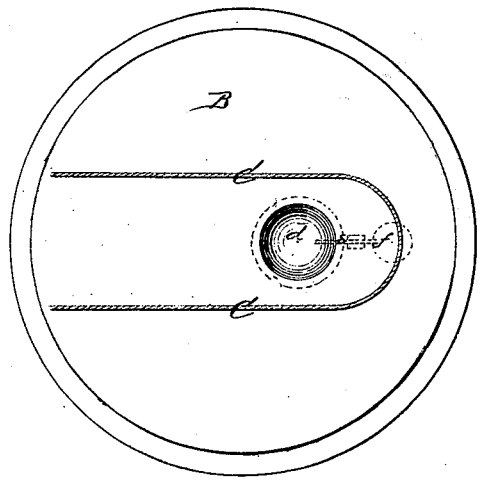

Figure 1 is a longitudinal vertical section, and
Figure 2 is a plan view with the seat removed.

A represents the vessel, of any suitable size and shape.

On the inside, near the top of this vessel, is a circumferential flange, $a$, forming a chamber at the top all around the vessel, wherein water is placed, and the rim $b$ of the cover B sits down in the water, thereby making a tight joint, so that no offensive odor can escape therefrom.

The cover B is slightly funnel-shaped, the opening being, however, not exactly in the center, but more to one side, and closed from underneath by a valve, $d$, attached to an arm, $e$, which is provided with a weight, $f$, at its other end.

This weight keeps the valve closed, but allows it to open when any substance is on its upper side, so as to let said substance down into the vessel A.

On the top of the cover B is secured a U-shaped collar, C, which is perforated with a number of holes around its lower edge.

This collar is calculated to hold back the water from the vessel till after using, and let it rinse through the holes gradually to clean off all or any deposit that may be left thereon.

On top of the cover C is placed the wooden seat D, provided with an opening corresponding in size and shape with the collar, and to said seat is hinged a lid, E.

Having thus fully described my invention,
What I claim as new, and desire to secure by Letters Patent, is—

1. The funnel-shaped cover B, provided with the perforated U-shaped collar C, substantially as and for the purposes herein set forth.

2. The combination of the vessel A with flange $a$, cover B with rim $b$, perforated collar C, valve $d$, seat D, and lid E, all constructed and arranged substantially as and for the purposes herein set forth.

In testimony that I claim the foregoing, I have hereunto set my hand and seal this 5th day of September, 1870.

W. H. PULVER. [L. S.]

Witnesses:
ROBERT HERMANCE,
JOHN H. SHELDON.